United States Patent [19]
Halsey

[11] Patent Number: 5,388,334
[45] Date of Patent: Feb. 14, 1995

[54] MECHANIZED COPING SAW

[76] Inventor: Thomas J. Halsey, 3493 Lewis Rd., Amelia, Ohio 45102

[21] Appl. No.: 186,655

[22] Filed: Jan. 25, 1994

[51] Int. Cl.⁶ .................................................. B23D 53/08
[52] U.S. Cl. .......................................... 30/509; 30/123; 30/380; 30/392
[58] Field of Search .................. 30/380, 509, 123, 514, 30/144, 392; 83/520, 521

[56] References Cited

U.S. PATENT DOCUMENTS

| | | |
|---|---|---|
| 392,943 | 11/1888 | Blake . |
| 617,440 | 1/1899 | Jones . |
| 710,838 | 10/1902 | Brines . |
| 803,694 | 11/1905 | Jones . |
| 1,258,695 | 3/1918 | Miller et al. . |
| 1,374,638 | 4/1921 | DeCew et al. . |
| 1,449,805 | 3/1923 | Arnold et al. . |
| 1,453,335 | 5/1923 | Bennett ................................ 30/380 |
| 1,584,630 | 5/1926 | Meighan . |
| 1,592,095 | 7/1926 | Funk . |
| 1,755,067 | 4/1930 | Kuenne . |
| 1,829,079 | 10/1931 | Young et al. . |
| 1,955,063 | 4/1934 | Greitzer ................................ 30/380 |
| 1,993,608 | 3/1935 | Kelley . |
| 2,383,871 | 8/1945 | McNeely . |
| 2,392,486 | 1/1946 | Larsen . |
| 2,596,081 | 5/1952 | Sacrey ................................ 30/380 |
| 2,604,910 | 7/1952 | Crosby . |
| 2,690,774 | 10/1954 | Hoard . |
| 2,696,228 | 12/1954 | Bowen . |
| 2,772,708 | 12/1956 | Miquel . |
| 3,104,688 | 9/1963 | Kuenne . |
| 3,211,016 | 10/1965 | Carter . |
| 3,621,894 | 11/1971 | Nicsich . |
| 3,658,102 | 4/1972 | Jooster ........................... 30/380 X |
| 3,738,403 | 6/1973 | Schwoch et al. . |
| 3,750,284 | 8/1973 | Swift ................................ 30/380 |
| 3,958,332 | 5/1976 | Gates et al. . |
| 4,001,937 | 1/1977 | Stelljes et al. ....................... 30/380 |
| 4,144,782 | 3/1979 | Lindstrom . |
| 4,242,798 | 1/1981 | Wikoff ................................ 30/380 |
| 4,258,763 | 3/1981 | Figueredo et al. . |
| 4,266,457 | 5/1981 | Blach et al. . |
| 4,413,414 | 11/1983 | Strzalka . |
| 4,502,184 | 3/1985 | Karubian ......................... 30/380 X |
| 4,592,261 | 6/1986 | Miyaji et al. .................... 30/380 X |
| 4,700,702 | 10/1987 | Nilsson . |
| 4,711,032 | 12/1987 | Rickmers et al. . |
| 4,833,782 | 5/1989 | Smith ................................ 30/392 |
| 4,949,464 | 8/1990 | Adomatis . |
| 5,220,729 | 6/1993 | Gallant . |

FOREIGN PATENT DOCUMENTS

| | | |
|---|---|---|
| 101176 | 10/1925 | Austria . |
| 1384536 | 3/1964 | France . |
| 835242 | 3/1952 | Germany . |
| 50077 | 9/1921 | Sweden . |
| 78568 | 3/1918 | Switzerland . |
| 212365 | 10/1923 | United Kingdom . |

Primary Examiner—Richard K. Seidel
Assistant Examiner—Hwei-Siu Payer
Attorney, Agent, or Firm—Wood, Herron & Evans

[57] ABSTRACT

A mechanized coping saw has a frame and handle attached thereto, the frame including a U-shaped portion with opposite leg sections having outward ends, a cavity formed within the U-shaped portion, and apertures proximate the outward ends of the leg sections which open into the cavity. An endless blade travels through the cavity of the U-shaped portion around rotating elements with a portion of the blade extending straight between the leg sections to define an exposed blade cutting section, A power drive system drives the blade through the cavity. The invention uses a pair of guide rollers which are placed along the profiled edge of a molding piece to steadily guide the blade cutting section for precise coping of the molding piece. The rollers are adjustable to provide for a variety of different cutting angles and situations. Another embodiment utilizes an elongated arced guide arm to extend longitudinally along the exposed blade cutting section for guiding and steadying the blade, Another embodiment includes a blade section cover pivotally mounted to move outwardly from the blade cutting section to expose the blade during coping.

26 Claims, 4 Drawing Sheets

MECHANIZED COPING SAW

FIELD OF THE INVENTION

This invention relates generally to coping saws and specifically to an improved mechanized coping saw which is utilized to rapidly and accurately cope and shape structural pieces such as pieces of molding.

BACKGROUND OF THE INVENTION

Traditionally, when a room is finished within a building, molding is sometimes applied around the room adjacent the juncture between the ceiling and the walls and/or adjacent the juncture between the floor and the walls. The molding adjacent the ceiling is generally referred to as crown molding, while the molding adjacent the floor is generally referred to as baseboard molding. Molding is installed along a wall, and the different pieces of molding meet in the corners of the room to provide a seemingly endless border around the ceiling and floor of the room.

Accordingly, for aesthetic purposes it is desirable that the pieces of molding meet at each corner juncture without a seam so as to provide a seemingly continuous, unbroken boundary of molding. Making two pieces of molding match up without a seam is difficult because in most instances, molding has an ornate exposed surface which includes a variety of projections, curves and indentations. One proposed way of eliminating the seam is to miter or cut the molding pieces at a particular angle which will allow two pieces to meet at a corner juncture and form a continuous structure. For example, a corner piece of molding will be mitered at 45° for a 90° room corner. However, it is very difficult to miter the molding so that there is an exact fit, and if the mitering is not exactly precise, a seam or crack appears and ruins the continuous look of the finished molding. Seamless mitering is especially difficult when the molding is tilted forward away from the wall, as crown molding often is.

Currently the most popular technique for affixing separate pieces of molding together in the corner juncture of a room is coping. Coping involves making a precise cut along one end of a piece of molding so that the cut end follows the unique projections, curves and indentations of the adjacent piece of corner molding. Proper coping of a piece of molding produces an almost perfect match at the corner juncture, and thereby yields an aesthetically pleasing continuous border structure around a room. Coping a piece of molding has traditionally required using a coping saw which is specially formed for the task of coping. A coping saw is a hand saw with a very narrow blade that is held under tension in a shaped frame and is used for cutting curves in wood.

However, coping with a traditional coping saw is a slow, arduous, and labor intensive task. The manual sawing takes place with the blade generally at an angle. Furthermore, the saw blade must be guided around various curves, notches and protrusions. The operator saws back and forth being careful to maintain and follow the proper molding curves necessary to make the two corner pieces of molding match. While it takes only seconds to miter a piece of molding with available miter boxes, depending upon the size of the molding, it takes approximately one minute to as long as ten minutes to cope the molding piece with a traditional coping saw. To further frustrate the coping process, homeowners are requesting the use of more and more hardwoods for their molding, thus making coping an even more difficult, physical and time-consuming job. As may be appreciated, the increased time spent coping a piece of wood decreases the production of the woodworker not only by making the molding installation process take longer, but also by physically tiring the woodworker such that his work is slowed down by simple exhaustion.

There have been attempts in the prior art to ease the task of coping. For example, the patent of Adomatis, U.S. Pat. No. 4,949,464 discloses a battery operated coping saw. The Adomatis coping saw utilizes a motor to drive a blade which reciprocates back and forth in a sawing motion. However, while such a design might seemingly reduce the continuous physical sawing motion normally required to cut with a coping saw, such a coping saw is not very useful from a practical standpoint. Coping is a very precise and tedious operation often requiring small, precise cuts around the various curves and protrusions of a piece of molding. The saw of Adomatis has a tendency to shake and jerk as it cuts because of the back and forth motion of the blade. This shaking tends to make precision cutting difficult and throws the blade out of line with the precise curves, which must be followed to accurately cope a piece of molding. Furthermore, the saw is difficult to even start on a piece of molding because of the shaking and jerking motion of the moving blade. As may be appreciated, starting the path of a coping saw into the correct curve line is a critical part of proper coping.

The prior art also discloses hand-held or portable powered sawing mechanisms. For example, the patent of Greitzer, U.S. Pat. No. 1,955,063 discloses such a portable power saw; however, the Greitzer saw is designed to accomplish very gross, straight cuts such as ripsaw work, crosscut work, metal cutting and the severing of bones in meat cutting. Because of the rigorous cutting action of the saw, the blade cannot be guided gently and precisely over a piece of molding. The Greitzer saw, typical of the prior art band saws is much too forceful and is not designed for the delicate cutting work involved with coping.

The structures and frames of the other various prior art saws are also designed to make straight cuts on large pieces of wood as opposed to the delicate curved cuts involved with coping. The saw of Niksich, U.S. Pat. No. 3,621,894 has a rigorous cutting action and requires two hands to operate and does not leave a hand free to hold and guide a piece of molding. Similarly, the saws of Meighan, U.S. Pat. No. 1,584,630; Crosby, U.S. Pat. No. 2,604,910; Hoard, U.S. Pat. No. 2,690,774 and Strzalka, U.S. Pat. No. 4,413,414 all require two hands to properly operate and manipulate the saw. When making straight cuts in large bulk pieces of wood for which these saws are designed, the pieces of wood are often held by a clamp or are propped up between two sawhorses and thus do not require the operator to hold the wood while sawing. However, coping is very precise and a preferable coping method is to have one hand steadying or manipulating the molding piece while the saw is manipulated around the various curves of the molding to cope the piece.

Consequently, there is a need for a coping saw which does not require the slow and tiresome physical sawing procedure of a traditional manual coping saw. There is further a need for a coping saw which can quickly and easily make precise cuts around any curves, notches and protrusions which are found on a piece of molding. There is still a further need for a coping saw which is easy to start in the proper cutting direction in a piece of molding and thereafter easily and precisely manipulated around the various molding curves to complete the coping process.

SUMMARY OF THE INVENTION

The present invention provides a unique coping saw which allows a woodworker to cope a piece of molding quickly, accurately, and with a minimum amount of physical exertion. Generally, the coping saw of the present invention has a frame which includes a handle and a generally U-shaped frame portion which is attached to the handle at one end. The U-shaped frame portion includes opposite leg sections with outward ends. Within the U-shaped frame portion, a cavity is formed and both of the leg sections have apertures which open into the cavity proximate the outward end of the leg sections.

An endless saw blade travels within the frame cavity around the U-shaped frame portion on a plurality of guide wheels preferably located at the corners of the frame. The endless blade has an exposed cutting section which extends out of the U-shaped frame portion through the leg section apertures and spans the distance between the outward ends of the leg sections. The exposed blade section is used to cut and cope a piece of molding when the endless blade is driven around the frame and through the cavity. The combination of the exposed blade cutting section and the U-shaped frame portion defines a cutting plane through which a piece of molding is passed when it is being coped. A power drive system, preferably located within the handle of the saw drives the blade so that it is operable to cut a piece of molding.

The direction of the blade is reversible, and the speed of the blade is adjustable so that the saw is able to handle a variety of different cutting jobs and applications. Further, the saw blade preferably has a cutting edge on both edges of the blade so that the saw may be used to cut from either side.

One embodiment of the mechanized coping saw of the present invention comprises first and second guide rollers disposed on opposite sides of the exposed blade cutting section. The guide rollers are mounted to the saw frame and are configured to be rollable in a direction generally parallel with the direction of the coping cut to be made in a piece of molding. The rollers are spaced from the cutting plane of the blade such that when a piece of molding is coped, the rollers press against the molding piece and follow the contour of the desired coping line. The rollers steadily guide the blade cutting section along the cut line and through the piece of molding to provide precise coping of the piece. The rollers are adjustable both vertically along the blade cutting section and horizontally toward and away from the blade cutting section and the frame so that they may be adjusted to guide the blade at a defined angle with respect to the molding piece. The adjustability of the rollers allows the coping saw to be adapted for a variety of different cuts and coping angles.

Besides providing accurate maneuvering of the blade around the various different molding projections and indentations, the rollers act as a lever fulcrum and facilitate starting the coping cut more accurately. The rollers are placed on a piece of molding with the blade suspended thereabove such that the molding piece is located out of the cutting plane. The saw is then pivoted downwardly at the point of roller contact on the piece to bring the molding piece into the cutting plane of the saw and to start the blade at the exact origination point for the coping cut. The simplicity with which a cut may be started utilizing the mechanized coping saw eliminates the frustration often associated with beginning a precise cut.

An alternative embodiment of the mechanized coping saw utilizes rollers which have grooves formed therein generally perpendicular to the roller axis of rotation and parallel to the direction of motion of the exposed cutting section such that the blade moves within the grooves. With a groove in each roller, a portion of the rollers extends into the defined cutting plane to guide the blade closer to the piece of molding when the coping cut is being made. This yields a smaller distance between the blades and the rollers and consequently provides closer guidance of the blade with the rollers for more precise cuts and more delicate coping.

Another embodiment of the mechanized coping saw utilizes an elongated guide arm which is mounted to extend in a direction generally parallel with the exposed blade cutting section but spaced to one side of the cutting section. The guide arm has a portion which is spaced away from the cutting section and defines a pivot point such that the guide arm may be placed on a piece of molding and the saw pivoted toward to molding piece to engage the blade cutting section and cut the piece. The arm follows along the cut line in the molding piece to steady the saw and guide the blade cutting section over the contours of the molding to precisely cope it. In that way, the guide arm performs a somewhat similar task as the rollers.

In a preferred embodiment, the guide arm has a rigid arced section which has a concave side and a convex side. The concave side of the arced section faces the blade cutting section, while the convex side faces away from the blade. The saw and blade may be pivoted smoothly on a molding piece at any point on the convex side of the arced section to steady the saw and move the cutting section downwardly in a controlled and guided fashion to cut and cope the molding piece. The convex side of the arc guide arm is preferably generally frictionless so that the guide arm may be moved smoothly along the cut line of the molding piece to guide the blade to accurately cope the molding. A section of the arc extends across the cutting plane of the exposed cutting section from one side of the cutting section to the other. The guide arm extended section completely guides and steadies the saw through the entire coping cut even after the saw has passed away from the molding piece. The extension facilitates accurate cuts and coping even at the ends of the molding piece.

Another alternative embodiment of the mechanized coping saw utilizes an elongated guide which is pivotally mounted to the frame to extend outwardly from the blade cutting section. The elongated guide is generally parallel the blade cutting section and is pivotable to either side of the saw in a direction generally perpendicular to the blade cutting section and the saw cutting plane. The guide is spring biased or otherwise biased to return to a rest position when it is not pivoted. The guide is placed upon a piece of molding to steady the saw frame and particularly to steady the blade cutting section. The saw is then moved down to the piece of molding against the biasing resistance of the pivoting guide to make a coping cut. The resistance provides more controlled coping. As the piece is coped, the pivoting guide moves over the piece to continuously steady the saw. Further, in addition to steadying the saw blade when coping the molding piece, the pivoting guide also steadies the saw when a cut is started at the top of the piece of molding. One variation of the saw utilizes a pivoting guide which includes a roller to easily roll over the molding piece while the coping cut is made.

The mechanized coping saw utilizes a power drive system comprising a motor which preferably is housed within the handle and has a rotating shaft and a gear connected to the motor shaft to rotate with the shaft. One variation of the mechanized coping saw utilizes a friction roller which grips a portion of the moving blade and continually drives the blade. Another variation utilizes a drive wheel with spaced teeth which fit into spaced grooves formed in the endless blade.

The remaining guide wheels in the frame cavity hold the blade on track through the frame so that the operation of the blade is smooth and uninterrupted. Each guide wheel has a ridge formed thereon proximate the center of the wheel periphery. The saw blade has a longitudinal groove therein. The wheel ridges are configured to fit within the longitudinal saw blade groove such that the guide wheels keep the blade on track within the frame. Preferably, there are two such guide wheels one located proximate each of the apertures in the frame so that the blade cutting section, extending through the apertures is guided for precise cuts.

The mechanized coping saw of the present invention includes a pivotable blade covering which extends over a portion of the exposed blade cutting section to cover a portion of the exposed blade so as to prevent injury. The blade cover swings readily out of the way during coping. Coping saw has a light mounted on the frame which directs a beam onto part of the exposed cutting section to illuminate the point of contact between the blade and a piece of molding so that the woodworker can see the coping cut in low light.

Another feature of the mechanized coping saw of the present invention is a blade cleaner which contacts a part of the exposed blade cutting section. The blade cleaner includes a head section which is directed against the blade to remove foreign materials such as sawdust from the surface of the blade as it cuts. One variation utilizes a ridge which fits into the longitudinal blade groove to clean the groove as the blade moves. The blade cleaner prevents foreign material from sticking to the blade and entering the cavity of the U-shaped frame portion which may hinder the smooth movement of the saw blade and may through the blade off of the track of the guide wheels.

DETAILED DESCRIPTION OF THE INVENTION

Figure 1A:
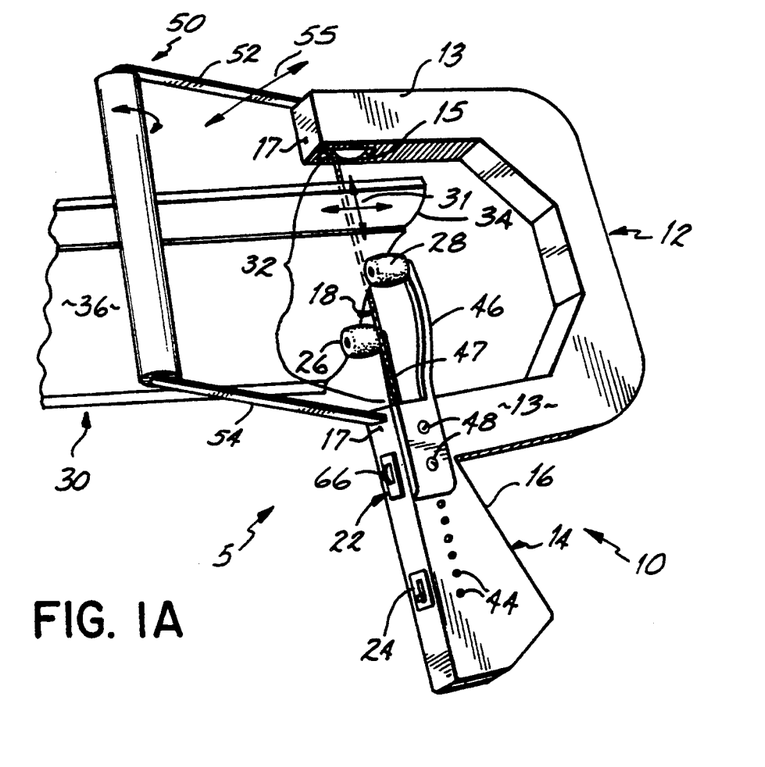
FIG. 1A is a perspective view of the coping saw of the present invention shown cutting a piece of molding.

FIG. 1A shows the mechanized coping saw which is designed to operate in accordance with the principles of the present invention. Coping saw 5 has a frame 10 comprising a generally U-shaped frame portion 12 attached at one end to a handle 14. Handle 14 has an angled side 16 for more comfortable gripping by the woodworker or carpenter. The frame portion 12 includes two opposite leg sections 13 with apertures 15 formed in the outward ends 17 of the leg sections 13. A cavity 19 is formed within frame 12 (See FIG. 3), and apertures 15 open into frame cavity 19.

A band blade 18 is driven through the cavity 19 formed within the U-shaped frame portion 12. The band blade has an exposed cutting section 32 defined by the section of blade 18 which extends outside of frame portion 12 and out of cavity 19 through apertures 15. The cutting section 32 extends between the opposite leg sections 13 of frame 12. As blade 18 moves, the cutting section 32 cuts and copes a piece of molding 30 as shown in FIG. 1A. Blade 18 is driven through frame portion 12 preferably by a power drive system located within handle 14. (See FIG. 3) An on and off switch 22 operates the power drive system while a blade direction switch 24 determines the direction of saw blade 18. Blade 18 preferably has cutting edges on both sides thereof so that the saw 5 can cut from either side as well as in either blade direction. (See FIG. 4A)

One preferred embodiment of the mechanized coping saw 5 of the present invention includes guide rollers 26, 28. The guide rollers 26, 28 are mounted to frame 12 and are configured to be rolled in a direction generally parallel with the direction of the coping cut in molding piece 30. Specifically, the rollers are spaced from a generally flat cutting plane 31 defined by saw frame 12 and blade cutting section 32. When a piece of molding 30 is coped, the guide rollers 26, 28 steadily guide the blade 18 of the saw 5 along the piece of molding 30 so that proper coping of the piece 30 may be achieved. Specifically, the rollers 26, 28 guide the exposed cutting section 32 of blade 18 over the various curves, indentations and protrusions of molding profile 34 to cope molding piece 30. Accordingly, the rollers 26, 28 are configured so that they may be rolled in line with the cutting direction of the blade 18 over molding profile 34. The rollers 26, 28 also act as a fulcrum to pivot the saw 5 such that the molding piece 30 crosses through the saw cutting plane 31.

Figure 1B:
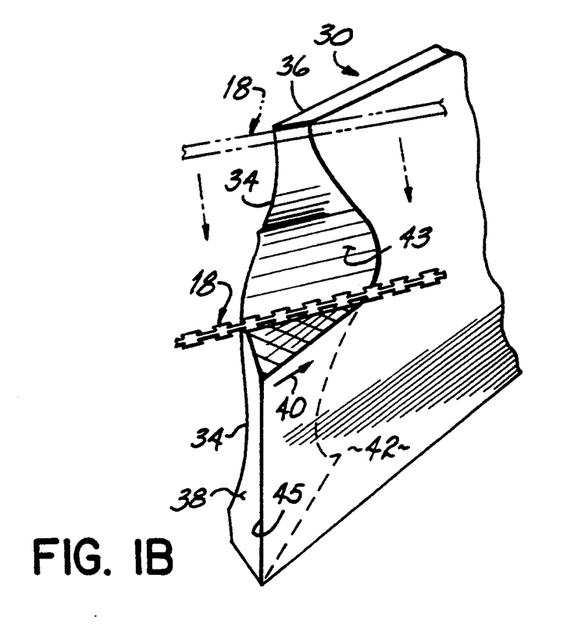
FIG. 1B is an exploded view of the molding illustrating the coping cut.

FIG. 1B illustrates generally how a piece of molding is coped at its end to achieve proper fit between two molding pieces in the corner of a room. The molding piece 30 has an ornate front face 36 which includes a variety of different curves, indentations and protrusions to give the appearance of a carved wood border. The shape of the front face 36 of piece 30 defines the curved profile edge 34 which must be followed during coping. Starting at the top of curved profile edge 34, the blade cutting section 32 is moved down precisely along the curves of profile edge 34 to the bottom of the molding piece 30. The cut removes material from the piece 30 at the rearward face 42 of the piece which is behind front face 36 and adjacent profile edge 34.

Generally, before a piece of molding 30 is coped, the two pieces of molding which are to be matched up in the corner are mitered. Ceiling molding often extends away from the wall at an angle. Mitering the two pieces achieves angled ends to the molding pieces which allows two pieces to fit together at a corner while assuming the chosen angle, such as 45°, away from the wall. That is, the pieces 30 are cut at an angle to define an angle at their ends to define angled end faces 38. Then, the angled end face 38 of the molding piece 30 must be coped on one of the matching pieces so that a portion of the uncoped molding piece fits behind the curved profile edge 34 of the coped molding piece 30.

In coping the angled end face 38, some of the molding material, such as wood, must be removed from piece 30 behind the ornate front face 36 and adjacent curved profile edge 34. A cut is made along curved profile edge 34 with the blade 18 angled behind edge 34 and into rearward face 42. The coping cut removes the molding board material to completely remove end face 38 and part of the rearward face 42 of board 30. The cut thereby defines another coped face 43. The coping cut removes ridge 45 on piece 30, and the face 43 does not interfere with the curves of the non-coped molding piece (not shown) when the pieces are installed in the corner. Therefore, the coped face 43 from the coping cut allows the two corner pieces of molding to fit together snugly in a tight, continuous juncture. FIG. 1B shows only part of the board actually coped, however, it may be appreciated that when the coping procedure is done, blade 18 will have made a cut along the entire length of profile edge 34 to define a fully coped face 43 on piece 30.

Starting the precise coping cut at the top of the curved profile edge 34 is often somewhat difficult with the traditional manual coping saw. Additionally, a mistake in the cut at the beginning affects the entire coped edge and the finished corner molding. The rollers 26, 28 of mechanized coping saw 5 may be used to very easily and accurately start the coping cut on profile edge 34, and thereafter may be used to effortlessly finish the coping cut in a matter of seconds.

Specifically, referring again to FIG. 1A, roller 26 is placed on the ornate front face 36 of molding piece 30. The cutting plane 31 of saw 5 is above molding piece 30. Frame 10 is then pivoted downwardly about roller 26 such that the cutting plane 31 passes into the plane of the molding piece 30 to begin the cut. By applying pressure to roller 26 and gripping handle 14 firmly while pivoting blade section 32 downwardly, the saw operator is able to begin the cut precisely at the desired point and at the desired angle with respect to end face 38 and edge 34.

Once the cut has been started, the saw 5 is pivoted further so that roller 28 contacts face 36. Blade 18 is moved down over profile edge 34 utilizing rollers 26 and 28 to steadily guide the blade section 32 to make a precise cut along edge 34. As the blade section 32 is moved down along curved edge 34, the blade 18 saws through the molding piece material, and as described above, removes a wedge of material including side face 38, ridge 45 and a portion of rear face 42 to define coped face 43. By rolling the rollers 26, 28 all the way along curve 34, keeping the blade angled against piece 30, a precise coping cut is made. The angle of coped face 43 is determined by how much material has to be removed from piece 30.

A proper coping cut may be made with saw 5 by utilizing only one roller, such as roller 26. However, preferably two rollers 26, 28 are used to guide blade 18 over the length of edge 34. Accordingly, the rollers 26, 28 are arranged with respect to frame 12 so that they contact piece 30 during the entire cut. Even after roller 26 has left piece 30, roller 28 is still in contact with the piece to finish the cut. In the embodiment of FIG. 1A, roller 28 is shown extended further along cutting section 32 than roller 26. This angles the path of the rollers 26, 28 so that a coping cut may be made with both rollers contacting piece 30. The saw 5 and cutting plane 31 are then held at an angle to the front face 36 during the cut. With two rollers guiding the blade, the coping cut may be made even more precisely.

To handle a variety of different cuts and cutting angles, rollers 26, 28 are adjustable in their orientation with respect to frame 12 and blade cutting section 32. Arm 46 which supports roller 28 is attached to saw frame 10 by screws 48 which attach into threaded holes 44 of handle 14. Using the series of threaded holes 44 along handle 14, to move roller 28 up and down along blade cutting section 32. Similarly, arm 47 roller 26 may be moved up and down along blade cutting section 32, using similar threaded holes 44 on the other side of handle 14. In this way, rollers 26 and 28 may be staggered to provide a variety of different cutting angles to allow a piece of molding to be coped with the saw 5 tilted at different angles. While roller extension arm 46 is shown attached to handle 14 utilizing screws, an equivalent attaching mechanism allowing arm 46 to slide up and down with respect to handle 14 may be utilized without departing from the scope of the present invention.

Figure 2:
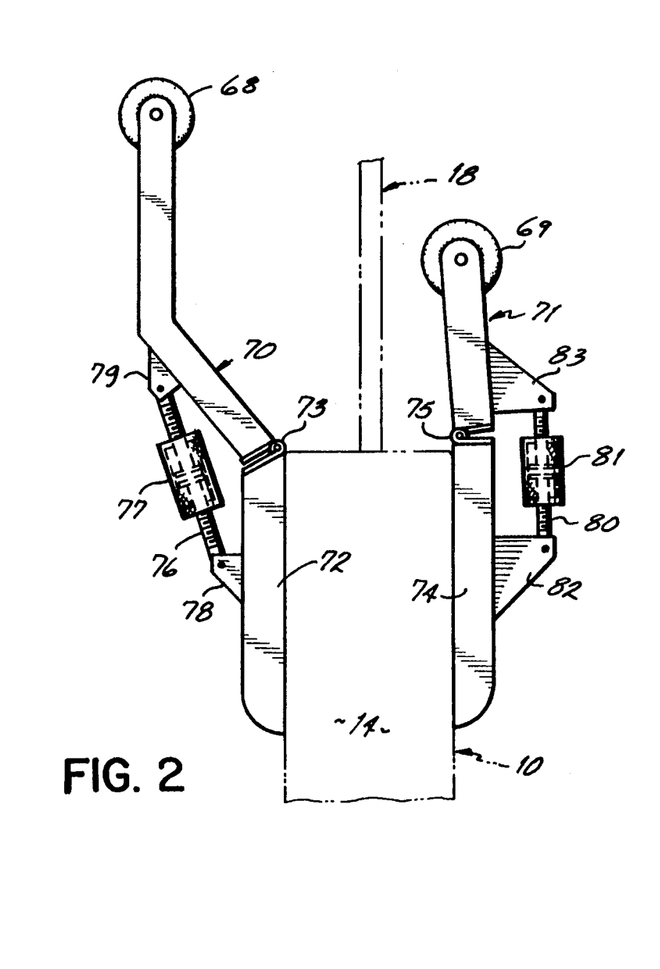
FIG. 2 is a front view of a variation of the present invention showing adjustable guide rollers.

Referring now to FIG. 2, an alternative roller design is shown using rollers 68, 69, which may be adjusted to vary the spacing between the rollers 68, 69, and cutting plane 31. Again, the cutting plane 31 is defined by frame 12 and exposed blade cutting section 32. Roller 68 and roller 69 are attached to handle 14 on support arms 70, 71, respectively. Both arms 70, 71 may be moved up and down along handle 14 as illustrated by arms 46, 47 in FIG. 1A. Arm 70 is hingedly attached to base 72 by hinge 73, while arm 71 is hingedly attached to base 74 by hinge 75. An adjustment screw 76 with an adjustment nut 77 extends between a flange 78 on base 72 and a similar flange 79 on arm 70. Rotation of the nut 77 drives screw 76 in and out of the nut 77 increasing or decreasing the screws length and hinging arm 70 toward and away from blade section 32 to adjust the spacing between the guide roller 68 and blade 18. A roller closer to blade 18 provides a more precisely guided coping cut because the roller 68 is closer to the point where blade 18 cuts into the piece of molding. Similarly, roller 69 is adjustable utilizing screw 80, adjustment barrel 81 and flanges 82, 83. The adjustment of spacing between rollers 68, 69 and blade 18 in combination with the height adjustment allows the woodworker to continually adjust the guide mechanism of the saw to match a particular coping cut or molding configuration as necessary.

The saw illustrated in FIG. 1A is configured for a right-handed carpenter. As may be appreciated, the various rollers may change from one side of the handle 14 to the other to make the saw left-hand compatible.

Figures 7A, 7B, 8A, 8B:
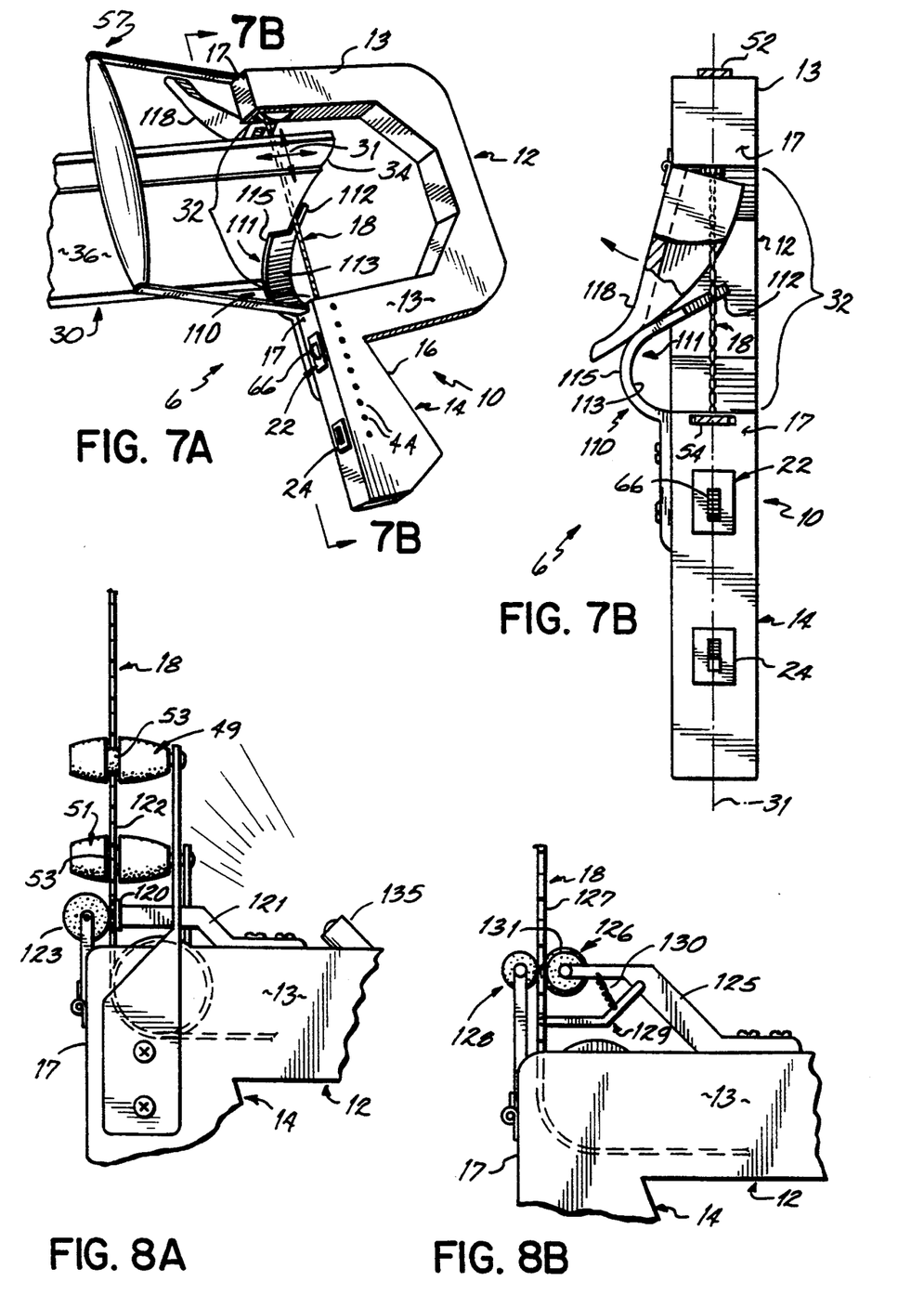
FIG. 7A is a perspective view of an alternative embodiment of the present invention.
FIG. 7B is a view taken along line 7B—7B of the coping saw of FIG. 7A.
FIG. 8A is a side view of a blade cleaning mechanism utilized with the mechanized coping saw of the present invention.
FIG. 8B is a side view of an alternative embodiment of the blade cleaning configuration of the present invention.

An alternative roller design for the coping saw of the present invention is shown in FIG. 8A. Rollers 49, 51 have peripheral grooves 53 formed therein. The peripheral grooves 53 are configured such that blade 18 passes through the grooves 53 as the saw cuts. In that way, the rollers 49, 51 may be mounted closer to the cutting edges of blade 18 and may even extend substantially into the cutting plane 31 of the saw. With the rollers 49, 51 closer to blade section 32, the rollers may be utilized to more precisely and closely guide blade 18 along the curved edge 34 of a piece of molding to make the desirable coping cut. As may be appreciated, the depth of grooves 53 will determine how close rollers 49, 51 may be placed to the blade 18 and the defined cutting plane.

The embodiment of the coping saw invention shown in FIG. 1A also includes an elongated guide 50 which is spaced from frame 10 and from the cutting section 32 of blade 18. The guide 50, is pivotally attached to frame 10 by opposite arm extensions 52, 54 which are pivotally attached at opposite ends of the U-shaped frame portion 12. Guide 50 is used to further steady saw frame 10 and guide blade 18 so that a precise coping cut may be made. The extensions 52, 54 are preferably spring loaded to offer resistance to the pivoting of guide 50 and to return arm roller 50 to its rest position after it has been pivoted. Preferably, guide 50 is a roller which will roll easily over a piece of molding. Guide 50 pivots in the direction of arrow 55 with respect to the frame 10.

More specifically, guide roller 50 is placed on the ornately curved face 36 of molding piece 30. The frame 10 may then be pivoted down against the resistance of spring loaded extensions 52, 54 until the piece of molding 30 passes through the cutting plane 31 of the saw. The roller 50 glides back and forth along face 36 as it pivots with respect to the saw. The pivoting guide provides tension against the frame 10 of the saw so that the saw does not shake and jerk during coping. Roller 50 also provides the initial tension against the frame that is necessary so that the coping cut may be precisely started on the profile edge 34. Guide roller 50 slides down the face 36 of piece 30 as the cut is made.

While guide roller 50 is shown in FIG. 1A in combination with rollers 26 and 28, it should be appreciated that rollers 26 and 28 may be removed so that all of the tension and guiding is provided by guide 50. As the coping cut is made, the guide 50 rolls back and forth and slides down face 36 providing guidance and tension to the blade 18 and frame 12 until the cut is complete. While guide roller 50 is shown to extend straight out from blade cutting section 32 and generally co-planar with the cutting plane 31, the guide 50 might also be angled with respect to cutting section 32 and plane 31 similar to the way that rollers 26 and 28 are staggered. The tilting will make at least a length of guide roller 50 lie juxtaposed and parallel with the plane of molding piece 30. In other words, since the coping cut is made with the blade cutting section 32 at an angle with respect to piece 30, the roller 50 would also be angled with respect to the cutting plane 31 to lie generally parallel with piece 30 and against face 36 as a cut is made.

Therefore, various adjustments may be made with rollers 26 and 28 and guide arm 50 to increase the versatility of saw 5. Furthermore, the doublesided blade in combination with the forward and reverse blade motion provided by switch 24 further increases the versatility and utility of saw 5.

Figure 3:
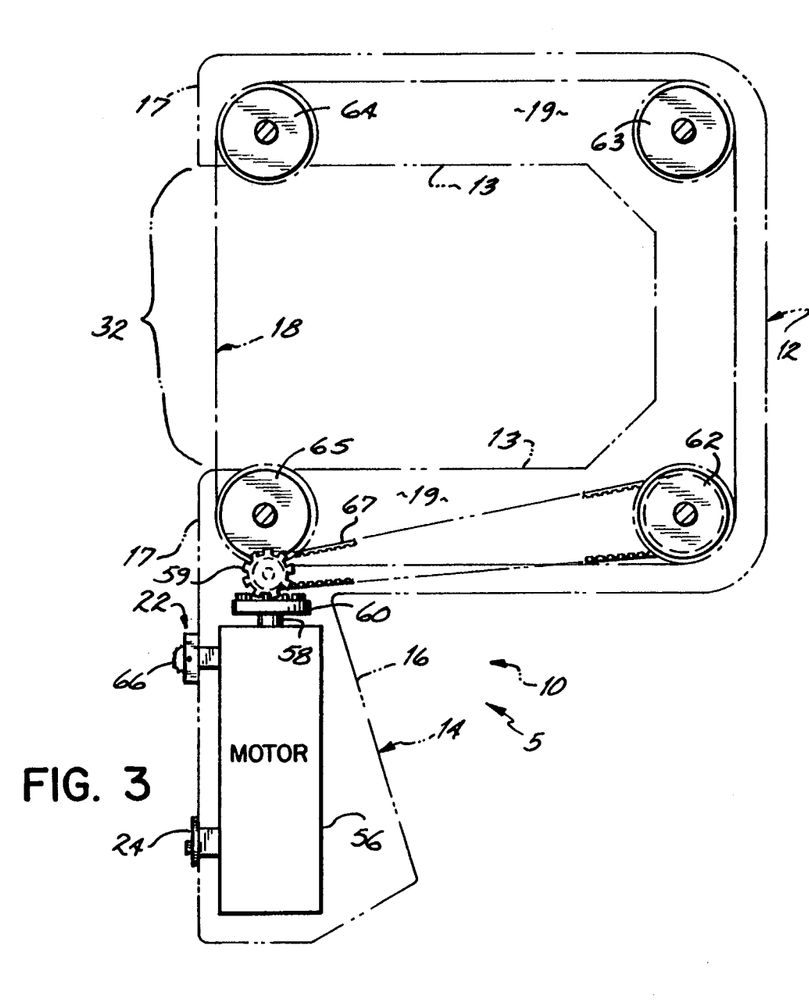
FIG. 3 is a side cross-sectional view of the power drive system of the coping saw of FIG. 1.

Referring now to FIG. 3, a blade drive system for one variation of the mechanized coping saw is shown. The drive system of FIG. 3 may be utilized in saw 5 of FIG. 1A, and accordingly, like numbers will be utilized to refer to like parts of the saw. The drive system includes a motor 56 which drives a rotating shaft 58 to rotate a gear 60 coupled to shaft 58. The motor may be battery operated or driven by AC power. The gear 60 is coupled to another gear wheel 59 which, in turn, is coupled to a belt 67. Rotation of gear wheel 59 drives belt 67. Gears 60 and 59 are coupled together such that rotation of gear 60 by motor 56 drives belt 67. The belt is coupled to drive wheel 62 to rotate the drive wheel. The drive wheel 62, in turn, drives the blade 18 around the cavity of frame portion 12. Guide wheels 63, 64, 65 are positioned at the various corners of U-shaped frame portion 12 to guide blade 18 around the frame portion 12.

Figure 6:
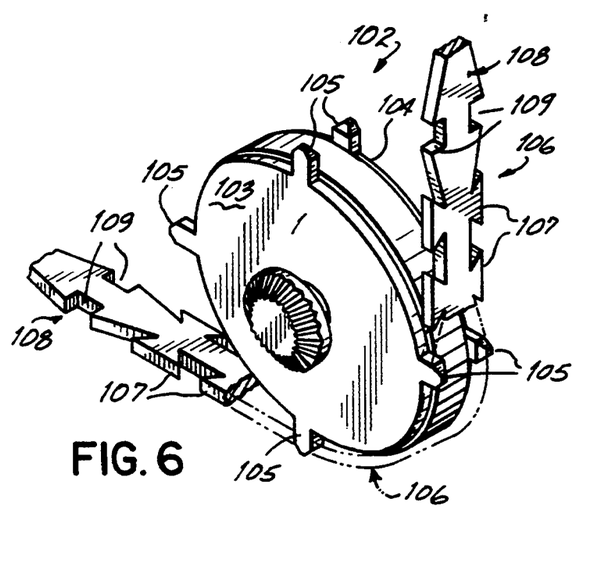
FIG. 6 is a perspective view of an alternative drive wheel used in the present invention.

While the variation of the invention shown in FIG. 3 utilizes a gear and belt coupling between motor 56 and drive wheel 62, other operating drive systems might be utilized to drive blade 18. For example, motor 56 might turn a gear coupled directly to a drive wheel located where guide wheel 65 is now shown. An example of such a directly coupled guide wheel is shown in FIG. 6. As may be appreciated, all of the numerous and various different coupling structures which might be utilized to drive blade 18 cannot be practically shown in this disclosure. As will be discussed below, the drive wheel 62 is not placed proximate apertures 15, because it is desirable to have guide wheels on the opposite ends of the blade cutting section. Switch 22 is coupled to motor 56 to turn the motor on and off while switch 24 determines the direction of rotation of motor 56 and consequently the direction of blade 18. A variable speed control such as provided by dial 66 might be utilized to control the speed of the motor and hence the speed of blade 18. The speed control may be incorporated into the on and off switch 22 as shown in FIG. 3 or may be provided as a separate control mechanism.

As the blade 18 is driven and moves around the various rotating guide elements or guide wheels 63, 64, 65 within the U-shaped portion 12, there may be a tendency for the blade 18 to come off of the track, i.e., fall off one of the guide wheels, thereby stopping the operation of the saw and possibly damaging the internal structure of the saw.

The present invention therefore utilizes guide wheels which keep blade 18 on its given path. The blade 18 of the present invention is grooved to enable it to stay aligned on the guide wheels. More specifically, referring to FIG. 4A, a blade 86 includes cutting teeth 87 on both sides of the blade. A longitudinal groove 88 is formed within blade 86. The guide wheel 89 which would be used in the place of guide wheels 63, 64, 65, includes a center ridge 90 which is configured to fit within the longitudinal groove 88 of blade 86. The ridge 90 seats within groove 88 to prevent blade 86 from shifting to one side or the other of guide wheel 89 thereby preventing blade 86 from falling off the side of wheel 89 or otherwise becoming misaligned. The grooved blade therefore stays within a defined track inside cavity 19 defined within the U-shaped frame portion 12. With the blade 86 securely in a track defined by the center ridge 90 of the guide wheels, the blade 86 produces a more precise coping cut.

Figure 4A:
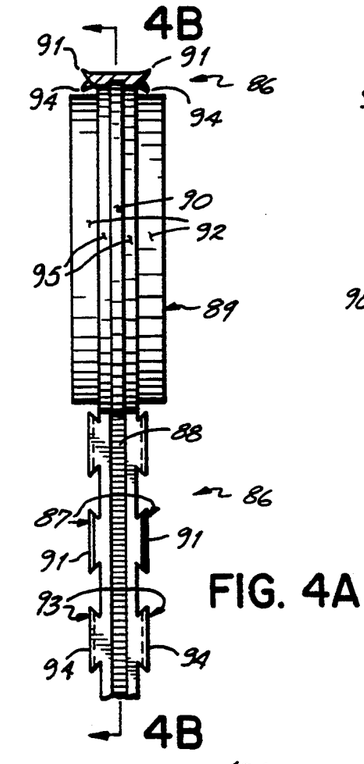
FIG. 4A is a front view of a guide wheel utilized within the mechanized coping saw of the present invention.
Figure 4B:
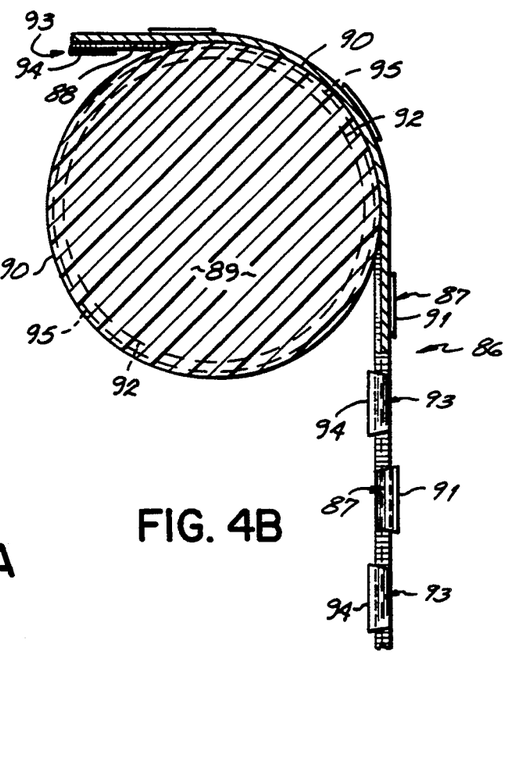
FIG. 4B is a side cross-sectional view of the guide wheel taken along line 4B—4B of FIG. 4A.

Blade teeth 87 on blade 86 have cutting edges 91 which extend in one direction facing away from wheel 89 as seen at the top of FIG. 4A. However, the adjacent pair of blade teeth 93 have oppositely extending cutting edges 94 which face wheel 89. If the blade 86 rests on wheel 89 and contacts the rotating surface 92, the wheel 89 may be damaged. The downwardly-extending blade cutting edges 94 will cut into surface 92 as blade 86 moves around wheel 86. To alleviate such a problem, the guide wheel 89 has an intermediate ridge 95 which extends between wheel 89 and ridge 90. The intermediate ridge 95 elevates ridge 90 and elevates the height of blade 86 above wheel 89. In that way, the downwardly extending cutting edges 94 of teeth 93 do not cut into and damage wheel 89, and the life of wheel 89 is prolonged. If the blade is such that it only has upwardly extending cutting edges such as cutting edge 91, then an intermediate ridge 95 would be unnecessary. FIG. 4B shows a cross-section of FIG. 4A wherein the clearance of blade 86 over surface 92 of wheel 89 is further illustrated.

Preferably, at least guide wheels 64 and 65 of the saw are configured like wheel 89. Guide wheels 64, 65 guide opposite ends of the exposed cutting section 32 of blade 18. It is critical for precise coping that the blade cutting section 32 drift from side to side as little as possible or not at all. The guide wheels of the present invention, therefore, keep the cutting section 32 aligned to keep the cuts straight and precise. The ridge 90 prevents any side drift. However, while guide wheels 63, 64, 65 ensure precise coping cuts, they are generally not used to drive blade 18.

Figure 5:
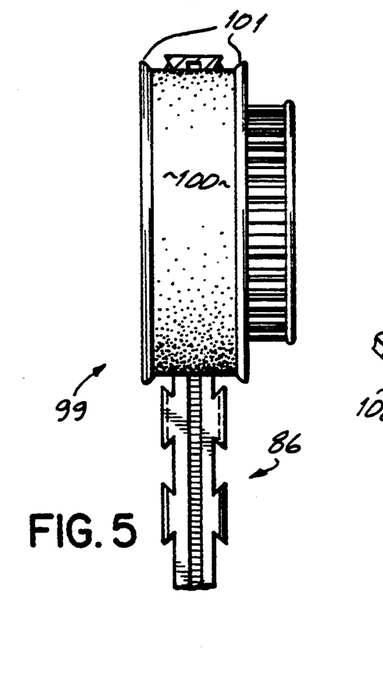
FIG. 5 is a front view of a drive wheel utilized in the present invention.

FIG. 5 illustrates one embodiment of a drive wheel used in the blade drive system of the present invention. Drive wheel 99 has a friction surface 100 containing a friction material such as rubber which grips a portion of the saw blade 86 to drive the blade in a particular direction when it turns. The tension of the blade around the drive wheel and guide wheels within the U-shaped frame portion 12 provides enough friction between surface 100 and the blade 86 such that when wheel 99 is turned, it drives the blade in a forward or reverse direction. Drive wheel 99 does not include a center ridge; however, opposing peripheral walls 101 prevent blade 86 from coming off wheel 99 should the blade drift to one or the other sides of surface 100. Referring to FIG. 3, a drive wheel such as drive wheel 99 shown in FIG. 5 might be utilized in the place of wheel 62 in FIG. 3 to drive the blade of the saw.

The friction provided by a drive wheel such as wheel 99 and surface 100 may be sufficient for a large variety of cutting jobs; however, harder wood may require a blade which will be driven against a high amount of reverse blade friction presented by the hardwood. In such a case, the drive wheel configuration of FIG. 6 might be utilized. FIG. 6 shows a wheel 102 with opposing sides 103, 104. Each of the opposing toothed wheel sides 103, 104 include a plurality of generally equally spaced teeth 105. As seen in FIG. 6, a blade 106 driven by wheel 102 includes cutting teeth 107 and notch sections 108 with individual opposing notches 109. The wheel teeth 105 and the notches 109 are spaced with respect to each other such that as wheel 102 rotates, the opposing wheel teeth 105 of sides 103, 104 fit within the opposing blade notches 109 to actually grip the blade 106 and drive it forward or backward to cut a piece of molding. Since wheel 102 actively grips blade 106 to drive the blade, even very hard woods may be cut with the saw. The teeth 105 and notches 109 prevent the possibility of blade slippage even if there is a large amount of reverse frictional resistance to the cutting action of the blade 106. Preferably the teeth 105 exist in pairs at equal positions on the wheel sides 103, 104 so that the blade 106 is driven equally from the sides of wheel 102 for an even coping cut. Furthermore, guide wheels (not shown) might be utilized having a similar construction as drive wheel 102.

FIG. 7A and 7B illustrate an alternative embodiment of the mechanized coping saw of the present invention. The saw of FIG. 7A is similar in many respects to the saw of FIG. 1A, and therefore, similar parts will be referred to by similar reference numerals. Referring now to FIG. 7A, a saw 6 with U-shaped frame portion 12 and handle 14 is utilized to cut a piece of molding 30. However, instead of opposing guide rollers 26, 28, the saw utilizes a stationary guide arm 110 mounted on one side of saw 6. During the use of the saw 6, the stationary guide arm 110 is placed on a piece of molding 30 and the saw 6 is pivoted downwardly at a point on guide arm 110 toward piece 30 such that the molding piece 30 passes through the cutting plane of saw 6 and is cut by blade 18.

Preferably, as further illustrated in FIG. 7B, the guide arm 110 includes an arced section 111 which has its concave side 113 facing toward the exposed blade cutting section and its convex side 115 facing away from the blade cutting section 32. In other words, the arced section 111 extends away from the blade cutting section 32 along a portion of its length and then curves to extend toward the cutting section 32. When starting a coping cut, the saw 6 is pivoted on the convex side 115 toward molding piece 30. As the blade 18 is lowered to cut, the arc of side 115 is rolled over the piece of molding 30 to bring cutting section 32 to the exact starting position on profile edge 34. The saw is then moved downwardly across the molding during a coping cut following profile edge 34 as described hereinabove with respect to FIGS. 1A, 1B. The guide arm 110 and specifically convex side 115 remains resting against the ornate curved face 36 of molding piece 30 to guide cutting section 32 of blade 18 along the curved profile edge 34. Therefore, not only does guide arm 110 provide a pivoting point so that the coping cut may be started accurately and precisely at a chosen point, but it also guides the blade 18 along profile edge 34 for the length of the coping cut.

Referring to FIG. 7B, it may be seen that a portion of the arced guide arm 110 extends across the cutting plane 31 of the saw as defined by the U-shaped frame portion 12 and blade cutting section 32. With a portion 112 extending from the guide arm 110 and across the cutting plane 31, section 32 may be guided completely through the coping cut. For example, without the extension portion 112, the main arced section 111 of guide arm 110 would pass off of the piece of molding 30 while blade cutting section 32 was still making the coping cut along profile edge 34. Therefore, the blade section 32 would still be sawing but would be unguided because no portion of the guide arm 110 would be resting against molding piece 30. As may be appreciated, guiding the blade section 32 manually without any effect by the guide arm 110 is difficult and hinders the precision of the coping procedure. Extension 112 passes from one side of the saw to the other and through cutting plane 31 to ensure that the blade cutting section 32 is guided by guide arm 110 through the entire coping cut. Accordingly, the convex side 115 of guide arm 110 may be coated with a low friction material so that guide arm 110 slides easily over the molding piece 30.

The degree of the arc of stationary guide arm 110 may be chosen much the same way that the staggered positions of the guide rollers 26 and 28 shown in FIG. 1A may be adjusted. That is, the arc will generally dictate the angle at which the saw 6 is tilted toward piece 30 during a cut. Furthermore, the guide rollers 26 and 28 of FIG. 1A and the stationary guide arm 110 of FIG. 7A may be made to be interchangeable on a similar saw frame such as by attaching the guide arm 110 with screws 48 and threaded holes 44. The guide arm 110 of FIG. 7A is for a right-handed saw 6; however, a left-handed saw may be fabricated using a similar guide arm constructed with the extension portion 112 moved to the other side of the arm 110.

The embodiment of the saw illustrated in FIG. 7A may also be utilized with a pivoting guide similar to guide 50 of the embodiment shown in FIG. 1A. Pivotal guide 57 of FIG. 7A further steadies and guides the saw during the cutting operation and also provides resistance as the saw is lowered down under tension to start the coping cut at the desired point along profile edge 34. The guide 57 is stationary and does not roll as does arm 50. However, guide 57 is formed to resemble a roller so that it smoothly drags over the molding face 36.

The mechanized coping also includes a blade guard 118 which covers a portion of the exposed blade cutting section to prevent injury. Specifically, referring to FIG. 7B the blade guard 118 is movably attached to the frame 10 and preferably to the U-shaped portion 12 of frame 10. The blade guard extends from the frame generally in a longitudinal direction parallel with the blade section 32 to cover a portion of the exposed blade 18. Covering a portion of the moving saw blade prevents injuries which may occur when the blade is inadvertently bumped against another object or a person. As illustrated in FIG. 7B, the blade guard 118 may be pivoted away from the exposed blade cutting section 32 to expose an additional length of the blade when desirable. Furthermore, blade guard 118 might be removed altogether.

As blade 18 cuts a piece of molding, there is a tendency for some of the cut molding material, such as sawdust if the molding pieces are wood, to stick to the blade 18 and be drawn into the frame cavity 19. Sawdust or other particles damage the power drive mechanism including the motor and guide wheels. Further, sawdust sticking to blade 18 throws the blade off of the track of the guide wheels 63, 64, 65. For example, a blade using a longitudinal groove as illustrated in FIGS. 4A and 4B might jump off of the guide ridge 90 if sawdust clogs the longitudinal groove 88. Therefore, the coping saw of the present invention uses a blade cleaning mechanism.

Referring to FIG. 8A, one variation of the blade cleaning mechanism includes contact pad 120 or some other contact surface which is held against blade 18 by a tension arm 121. Pad 120 contacts the side of blade 18 which contacts the surfaces of the guide rollers in order to prevent the blade from coming off of the guide rollers. Preferably, the pad 120 includes a ridge (not shown) which fits within the longitudinal groove of the blade to remove sawdust from the groove. To increase the tension of pad 120 against the inward surface 122 of blade 18, a spring loaded roller 123 is utilized to press and hold the blade 18 against contact pad 120. Therefore, any sawdust on blade 18 is scraped off and a clean surface is presented to roll over the guide wheels of the saw.

An alternative variation of the cleaning mechanism of the saw is illustrated in FIG. 8B. Extension arm 125 holds roller 126 against the inside surface 127 of blade 18. The roller 126 has a ridge 131 which is configured to fit into the groove of blade 18. Roller 126 and ridge 131 further guide blade 18 and steady the exposed cutting section 32. A spring loaded roller 128 holds blade 18 against roller 126. An additional level of cleaning is provided by a spring biased scraper arm 129 which is held under the tension of spring 130 against the inward surface 127 of blade 18. The arm 129 is configured to fit within the longitudinal groove of the blade 18 to remove sawdust and other material from the groove. Other blade cleaning configurations might be utilized to direct a cleaning pad or surface against a side of blade 18, and various designs will be obvious to a person of ordinary skill in the art. Therefore, the present invention is not limited to a particular blade cleaning apparatus and equivalent blade cleaning apparatuses may be utilized with the saw of the present invention without deviating from its scope.

Referring to FIG. 8A, one embodiment of the saw of the present invention utilizes a light 135 to shine on a portion of the blade cutting section 32. This helps to illuminate the profile edge 34 of a piece of molding for an accurate cope when the saw frame and woodworker block overhead lighting.

While the present invention has been illustrated by the description of embodiments thereof, and while the embodiments have been described in considerable detail, it is not the intention of Applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of Applicants' general inventive concept.

What is claimed is:

1. A mechanized coping saw for coping a profiled edge of a piece of molding comprising:
   a frame including a handle and a generally U-shaped portion joined to the handle, the U-shaped portion including a cavity formed within the U-shaped portion along its length and having opposite leg sections with outward ends, each leg section having an aperture proximate its outward end which opens into the cavity;
   rotating elements located within the cavity;
   an endless blade configured to travel within the cavity of the U-shaped portion around the rotating elements, the blade having an exposed cutting section which extends out of the U-shaped portion through the apertures and generally straight between the outward ends of the leg sections, said blade having a cutting edge on at least one side edge thereof;
   a power drive system coupled to at least one of the rotating elements to drive the blade through the cavity so that the cutting section is operable to cut the piece of molding;

a first roller mounted to the frame to one side of the exposed blade cutting section, said roller being spaced from and facing to said cutting edge, the roller being rollable along the profiled edge of the molding at a position located generally one of forward and rearward of the cutting edge whereby by applying pressure to the roller against the profiled edge and gripping the handle firmly while pivoting the blade cutting section downwardly, a saw operator is able to begin a cut at precisely a desired point and to maintain a desired precise cutting pattern to support and steadily guide the blade cutting section along the profiled edge as the blade precisely cuts and copes the molding.

2. The mechanized coping saw of claim 1 further comprising a second roller mounted to a side of the blade cutting section opposite said one side of the blade cutting section and being rollable along the profiled edge to steadily guide the blade cutting section from both sides of the cutting section to precisely cut and cope the molding piece.

3. The mechanized coping saw of claim 2 wherein both of the first and second rollers are each mounted to the frame by a movable member, each member being independently movable to vary the spacing between each roller and the blade cutting section.

4. The mechanized coping saw of claim 2 wherein both the first and second rollers are each mounted to the frame by a movable member, each member being independently movable with respect to the frame to move each roller longitudinally along the length of the blade cutting section.

5. The mechanized coping saw of claim 4 wherein one of the first and second rollers is mounted longitudinally further along the length of the blade cutting section than the other roller to provide a staggered roller configuration such that the blade cutting section is guided along the profiled edge at an angle to the molding.

6. The mechanized coping saw of claim 1 wherein the first roller is mounted to the frame by a movable member, the member being movable to vary the spacing between the first roller and the blade cutting section of the saw.

7. The mechanized coping saw of claim 1 wherein the first roller is mounted to the frame by a movable member, the member being movable with respect to the frame to move the roller longitudinally along the length of the blade cutting section.

8. The mechanized coping saw of claim 1, the first roller including a groove formed therein generally parallel with the blade cutting section, and a portion of the blade cutting section traveling through the groove whereby the blade cutting section may be guided closer to a piece of molding by the roller to more precisely cope the molding.

9. The mechanized coping saw of claim 1, the power drive system comprising a motor with a rotating shaft, a belt coupled to at least one of the rotating elements to drive said one rotating element, and a gear system coupling the rotating shaft to the belt such that when the rotating shaft rotates, the belt drives said one rotating element to drive the blade through the U-shaped portion.

10. The mechanized coping saw of claim 9, wherein the motor operates to rotate the shaft at one of a number of different speeds such that the blade may be driven at varying speeds.

11. The mechanized coping saw of claim 1, the power drive system including a mechanism which is operable to drive the endless blade in one of a forward and a reverse direction.

12. The mechanized coping saw of claim 1, the blade having a longitudinal groove therein, at least one of the rotating elements having an elevated ridge which fits within the groove of the blade to prevent the blade from disengaging from the rotating element as the blade is driven through the U-shaped portion.

13. The mechanized coping saw of claim 1, wherein said cutting edge is on both edges of the blade to cut from both sides of the saw.

14. The mechanized coping saw of claim 1 further comprising a blade cover extending from the frame generally parallel with the cutting section of the blade and to one side thereof whereby to cover part of the exposed blade cutting section to prevent injury.

15. The mechanized coping saw of claim 14 wherein the cover is movably attached to the frame to be moved away from the blade to uncover a greater length of exposed blade cutting section.

16. The mechanized coping saw of claim 1, further comprising a light mounted on the frame with a beam directed to illuminate part of the exposed blade cutting section whereby to provide illumination to a point of contact between the blade and the piece of molding.

17. The mechanized coping saw of claim 1, further comprising a blade cleaner contacting a part of the exposed blade cutting section, the blade cleaner including a member directed against a surface of the blade to remove foreign material from the surface of the blade while it cuts whereby to prevent cut molding material from entering the cavity of the U-shaped portion.

18. The mechanized coping saw of claim 17 wherein the blade cleaner includes an arm spring loaded to press against the blade and remove sawdust.

19. The mechanized coping saw of claim 17 wherein the blade cleaner includes a pad directed against the blade surface.

20. The mechanized coping saw of claim 1, said one rotating element being a wheel, the wheel having a friction surface which contacts the blade and drives the blade through the frame cavity and around the frame by friction between the blade and the friction surface.

21. The mechanized coping saw of claim 1, said one rotating element being a wheel, the wheel having spaced teeth around peripheral edges of the wheel, the endless blade including notches dimensioned in the blade to receive the teeth of the wheel whereby rotation of the wheel seats the teeth in the notches to hold and drive the blade.

22. A mechanized coping saw for coping a profiled edge of a piece of molding comprising:

a frame including a handle and a generally U-shaped portion joined to the handle, the U-shaped portion including a cavity formed within the U-shaped portion along its length, and having opposite leg sections with outward ends, each leg section having an aperture proximate its outward end which opens into the cavity;

rotating elements located within the cavity;

an endless blade configured to travel within the cavity of the U-shaped portion around the rotating elements, the blade having an exposed cutting section which extends out of the U-shaped portion through the apertures and generally straight between the outward ends of the leg sections to define a cutting plane;

a power drive system coupled to at least one of the rotating elements to drive the blade through the cavity so that the cutting section is operable to cut the piece of molding;

a guide pivotally mounted to the frame and located at a position outwardly from the blade cutting section, the guide being pivotable with respect to the frame and biased to return to a rest position, such that the guide may be placed upon the piece of molding to steady the saw frame and the blade cutting section and may then be subsequently pivoted as the blade cutting section is brought into contact with the piece of molding to cut and cope the molding against the bias of the guide.

23. The mechanized coping saw of claim 22, at least a portion of the guide being rollable so that the guide may roll along the piece of molding as it is pivoted and the molding is cut and coped.

24. A mechanized coping saw for coping a profiled edge of a piece of molding comprising:

a frame including a handle and a generally U-shaped portion joined to the handle, the U-shaped portion including a cavity formed within the U-shaped portion along its length and having opposite leg sections with outward ends, each leg section having an aperture proximate its outward end which opens into the cavity;

rotating elements located within the cavity;

an endless blade configured to travel within the cavity of the U-shaped portion around the rotating elements, the blade having an exposed cutting section which extends out of the U-shaped portion through the apertures and generally straight between the outward ends of the leg sections;

a power drive system coupled to at least one of the rotating elements to drive the blade through the cavity so that the cutting section is operable to cut the piece of molding;

an elongated guide arm mounted on the frame to extend generally longitudinally with the exposed blade cutting section and spaced to one side of the blade cutting section, the guide arm configured to rest proximate the profiled edge of the molding to support the saw on the molding and having a guide surface to slide over the profiled edge to support and steadily guide the blade cutting section along the profiled edge as the blade precisely cuts and copes the molding.

25. The mechanized coping saw of claim 24 wherein the guide arm includes a rigid arced section having a concave side and a convex side, the concave side of said arced section facing the blade cutting section and the convex side facing outwardly from the cutting section to be placed against the profiled edge of the molding, the saw being guidable over the molding by guiding the convex side over the profiled edge.

26. The mechanized coping saw of claim 24 wherein an extension section of the arced section extends from one side of the blade to the other, the saw being guidable with the extension section to guide the blade cutting section through the entire coping cut.

* * * * *

UNITED STATES PATENT AND TRADEMARK OFFICE
CERTIFICATE OF CORRECTION

PATENT NO. : 5,388,334

DATED : February 14, 1995

INVENTOR(S) : Thomas J. Halsey

It is certified that error appears in the above-identified patent and that said Letters Patent is hereby corrected as shown below:

Col. 15, line 20, after "cutting section and" insert --spaced from the cutting edge, said rollers--.

Signed and Sealed this

Seventeenth Day of October, 1995

Attest:

BRUCE LEHMAN

*Attesting Officer*　　　*Commissioner of Patents and Trademarks*